(12) United States Patent
Ono et al.

(10) Patent No.: US 9,488,847 B2
(45) Date of Patent: Nov. 8, 2016

(54) VARIABLE OPTICAL ATTENUATOR

(71) Applicant: FDK Corporation, Tokyo (JP)

(72) Inventors: Hiroaki Ono, Tokyo (JP); Kenji Sahara, Tokyo (JP); Yuko Ota, Tokyo (JP); Takashi Kato, Tokyo (JP)

(73) Assignee: Kohoku Kogyo Co., Ltd., Nagahama-shi (JP)

( * ) Notice: Subject to any disclaimer, the term of this patent is extended or adjusted under 35 U.S.C. 154(b) by 288 days.

(21) Appl. No.: 13/896,787

(22) Filed: May 17, 2013

(65) Prior Publication Data

US 2013/0308188 A1 Nov. 21, 2013

(30) Foreign Application Priority Data

May 18, 2012 (JP) ................. 2012-114942

(51) Int. Cl.
  *G02B 27/28* (2006.01)
(52) U.S. Cl.
  CPC .................. *G02B 27/281* (2013.01)
(58) Field of Classification Search
  CPC ............... G02F 1/09–1/0955; G02F 2203/48; G02B 27/281
  See application file for complete search history.

(56) References Cited

U.S. PATENT DOCUMENTS

| | | | |
|---|---|---|---|
| 4,340,304 A * | 7/1982 | Massie | 356/489 |
| 2002/0021484 A1* | 2/2002 | Onaka et al. | 359/283 |
| 2004/0027637 A1* | 2/2004 | Sahashi et al. | 359/280 |
| 2008/0037098 A1* | 2/2008 | Nakamura | G02F 1/093 359/283 |
| 2009/0244415 A1 | 10/2009 | Ide | |
| 2010/0054759 A1* | 3/2010 | Oda | H04B 10/6971 398/202 |

FOREIGN PATENT DOCUMENTS

| | | |
|---|---|---|
| JP | 09-061770 | 3/1997 |
| JP | 2010-140046 | 6/2010 |
| WO | WO 2008/059787 A1 | 5/2008 |

OTHER PUBLICATIONS

Ogawa et al.; 100 Gbit/s Optical Receiver Front-end Module Technology; NTT Technical Review; vol. 9, No. 3; pp. 1-7; Mar. 2011.
Japanese Office Action Issued in corresponding Japanese Patent App. No. 2012-114942 dated Jan. 5, 2016 (with translation).

\* cited by examiner

*Primary Examiner* — Thomas K Pham
*Assistant Examiner* — Cara Rakowski
(74) *Attorney, Agent, or Firm* — Greer Burns & Crain Ltd.

(57) ABSTRACT

A variable optical attenuator in which a polarization beam splitter splits a beam incoming from the front into two linearly-polarized beams perpendicular to each other and separately outputs them to the back along first and second light paths. A Faraday rotator rotates a polarization plane of the two incoming linearly-polarized beams to an arbitrary angle by controlling a magnetic field to be applied to a Faraday element by a magnetism applying means and outputs them to the back. First and second analyzers arranged in the first and the second light paths and parallelly arranged perpendicular to these light paths are arranged in that order. The two analyzers have optical axes perpendicular to each other so that the optical axes are in the same direction as that of the polarization plane of the two linearly-polarized beams output from the polarization beam splitter.

5 Claims, 7 Drawing Sheets

VARIABLE OPTICAL ATTENUATOR

CROSS-REFERENCE TO RELATED APPLICATIONS

This application claims the benefit of priority to Japanese Patent Application 2012-114942 filed on May 18, 2012, which is incorporated herein by reference in its entirety.

BACKGROUND OF THE INVENTION

1. Field of the Invention

The present invention relates to a variable optical attenuator and specifically relates to a variable optical attenuator to be applied to a digital coherent receiver.

2. Description of the Related Art

A digital coherent transmission technology is attracting attention as a technology to realize a large-capacity optical communication of a 100 Gbps per wavelength class. This transmission technology is a technology to transmit information using both of the amplitude and the phase of the light. The digital coherent receiver is a primary constituent element of the transmission technology and is a device that converts the information of both of the amplitude and the phase of the light to an electric signal. The Dual Polarization-Quadrature Phase Shift Keying (DP-QPSK) system is well known as a system related to the digital coherent transmission technology.

FIG. 1 depicts a configuration of a digital coherent receiver 100 as a primary constituent element of the digital coherent transmission technology. Shown here is the digital coherent receiver 100 of the DP-QPSK system. The receiver 100 has a function of performing signal demodulation by causing a light signal 140 from an information transmission path and a local light 141 to interfere with each other and is composed of a part called a light receiving front end (FE) 110 and an analog-digital converter (ADC) 120 and a digital signal processor (DSP) 130 arranged at the stage subsequent thereto.

The light receiving FE 110 is composed of a light signal processing unit 111 and an OE (Optical/Electrical) converting unit 112. The light signal processing unit 111 includes polarization beam splitters (PBSs) 113 and 114 and a 90° optical hybrid 115. The OE converting unit 112 includes a photodiode (PD) 116 that converts the light output from the optical signal processing unit 111 to the electric signal and a transimpedance amplifier 117 to perform an impedance conversion and an amplification of the electric signal, outputting it as a voltage signal. The light receiving FE 110 converts an input DP-QPSK-modulated light signal to four pairs of high-speed differential electric signals of differing light polarization components and phase components and outputs them. The digital coherent transmission technology is described in detail in "NTT Technical Journal 2011 vol. 23 No. 3, Research and Development of Optical Component Technology for 100 Gbit/s Digital Coherent Communication, '100 Gbit/s Light Receiving FE Module Technology'" (Nippon Telegraph and Telephone Corporation, URL: http://www.ntt.co.jp/journal/1103/files/jn201103046.pdf).

Incidentally, an optical attenuator 1 is an optical circuit component, lying in the transmission path of the optical signal 140 to be input to the light receiving FE 110 of the digital coherent receiver 100 described above, to variably control the intensity of the optical signal and is composed of, for example, a polarizer and an analyzer having a crossed Nichol relationship to each other arranged along the optical axis and a variable Faraday rotator that variably controls the rotational direction of the polarization plane of the linearly-polarized light between the polarizer and the analyzer.

The variable Faraday rotator is configured to include a Faraday element composed of magneto-optical materials and a magnetism applying means of applying a magnetic field to this Faraday element. The magnetism applying means is capable of variably controlling the direction and the magnitude of the magnetic field and is composed of a permanent magnet to magnetically saturate the Faraday element and a coil (electromagnet) to apply a variable magnetic field perpendicular to the field direction of the permanent magnet to the Faraday element.

In the variable optical attenuator having the variable Faraday rotator of the above configuration, when the light enters from the polarizer side, the linearly-polarized light transmitted by the polarizer enters the Faraday rotator and at this moment, by variably controlling the magnitude of the current applied to the coil making up the electromagnet, the polarization plane of the incoming linearly-polarized light can be rotated at an arbitrary angle. By this, the light of the intensity corresponding to the angle at which the polarization plane of the linearly-polarized light transmitted by the variable Faraday rotator and the optical axis of the analyzer cross is output from the analyzer. A configuration, an operation, etc., of the variable Faraday rotator are described in Japanese Laid-Open Patent Publication No. 1997-61770.

As described above, the digital coherent transmission technology has the digital coherent receiver as its primary constituent element. With this receiver alone, however, the optical communication using the digital coherent transmission technology is not realized. Namely, the variable optical attenuator to adjust the level of the light signal to be transmitted to the receiver becomes an essential component. Therefore, in the case of evaluating the performance, etc., of the digital coherent receiver, discussion should be made based on the configuration of the digital coherent receiver and the variable optical attenuator.

The digital coherent receiver includes the polarization beam splitter and to connect two optical devices of the digital coherent receiver including this polarization beam splitter and the variable optical attenuator, optical fibers of the variable optical attenuator and the polarization beam splitter and the optical fibers of the polarization beam splitter and the 90° optical hybrid are respectively fused to each other. For this reason, a space is required for spreading out the optical fibers to be fusion-spliced to each other. Of course, a space is also required for separately storing the variable optical attenuator and the polarization beam splitter. There are two points at which the optical fibers are fused to each other and deterioration and loss of the optical signal are feared.

Surely, the 90° optical hybrid and the polarization beam splitter making up the digital coherent receiver can be integrated as one unit but the 90° optical hybrid is substantially a Mach-Zehnder interferometer formed by a planar lightwave circuit (PLC) and the PLC is not suitable for miniaturization. For this reason, when the 90° optical hybrid and the polarization beam splitter are integrated as one unit, not only the Mach-Zehnder interferometer but also the polarization beam splitter is formed by the PLC and an increased size is unavoidable. Anyway, there has been a problem that it is extremely difficult to achieve the configuration containing the digital coherent receiver and the variable optical attenuator and the miniaturization of the digital coherent receiver itself.

SUMMARY OF THE INVENTION

In order to solve the above problem, in a variable optical attenuator according to one aspect of the present invention, with the light travelling in the direction from the front to the back, along a light path from the front, a polarization beam splitter, a variable Faraday rotator, and two, first and second, analyzers parallelly-arranged in the direction perpendicular to the light path are arranged in the mentioned order;

the polarization beam splitter splits the light incoming from the front along one light path into two linearly-polarized beams perpendicular to each other and separately outputs the two linearly-polarized beams along two, first and second, light paths heading backward;

the variable Faraday rotator is configured to include a Faraday element composed of magneto-optical materials and a magnetism applying means of variably controlling the direction and the magnitude of a magnetic field to be applied to the Faraday element and, with the magnetism applying means controlling the magnetic field to be applied to the Faraday element, rotates the polarization plane of the two linearly-polarized beams along the first and the second light paths incoming from the front to any arbitrary angle and outputs these beams to the back; and the first and the second analyzers have optical axes perpendicular to each other so that these optical axes will be in the same direction as that of the polarization plane of the two linearly-polarized beams along the first and the second light paths output to the back by the polarization beam splitter.

The variable optical attenuator can be one in which a part of the light incoming from the front along the one light path is caused to diverge in the direction different from that of the light path and a network tap that receives the diverging light to output the electric signal corresponding to the intensity of the received light is disposed anterior to the polarization beam splitter.

The variable optical attenuator can be one in which the polarization beam splitter is a double refraction element and a phase-compensating plate to compensate for a phase difference between the ordinary light and the extraordinary light in the double refraction element is disposed posterior to the first and the second analyzers.

The magnetism applying means can be composed of the electromagnet to apply the variable magnetic field to the Faraday element in an anteroposterior direction and the permanent magnet to apply saturated magnetism in the direction perpendicular to the light path.

Alternatively, it can be so arranged that the magnetism applying means will be composed of the electromagnet to apply the variable magnetic field to the Faraday element in the direction perpendicular to the light path and the permanent magnet to apply the saturated magnetism in the anteroposterior direction; and that the electromagnet will be so configured that both ends of its C-shaped yoke sandwich the Faraday element from the direction perpendicular to the light path and the permanent magnet will be of a hollow-cylindrical shape and will be disposed anterior or posterior to the Faraday element.

In addition, the problems disclosed by this application and the solutions thereof will become apparent from descriptions of this specification and of the accompanying drawings.

DESCRIPTION OF THE PREFERRED EMBODIMENTS

First Embodiment

Figure 2:
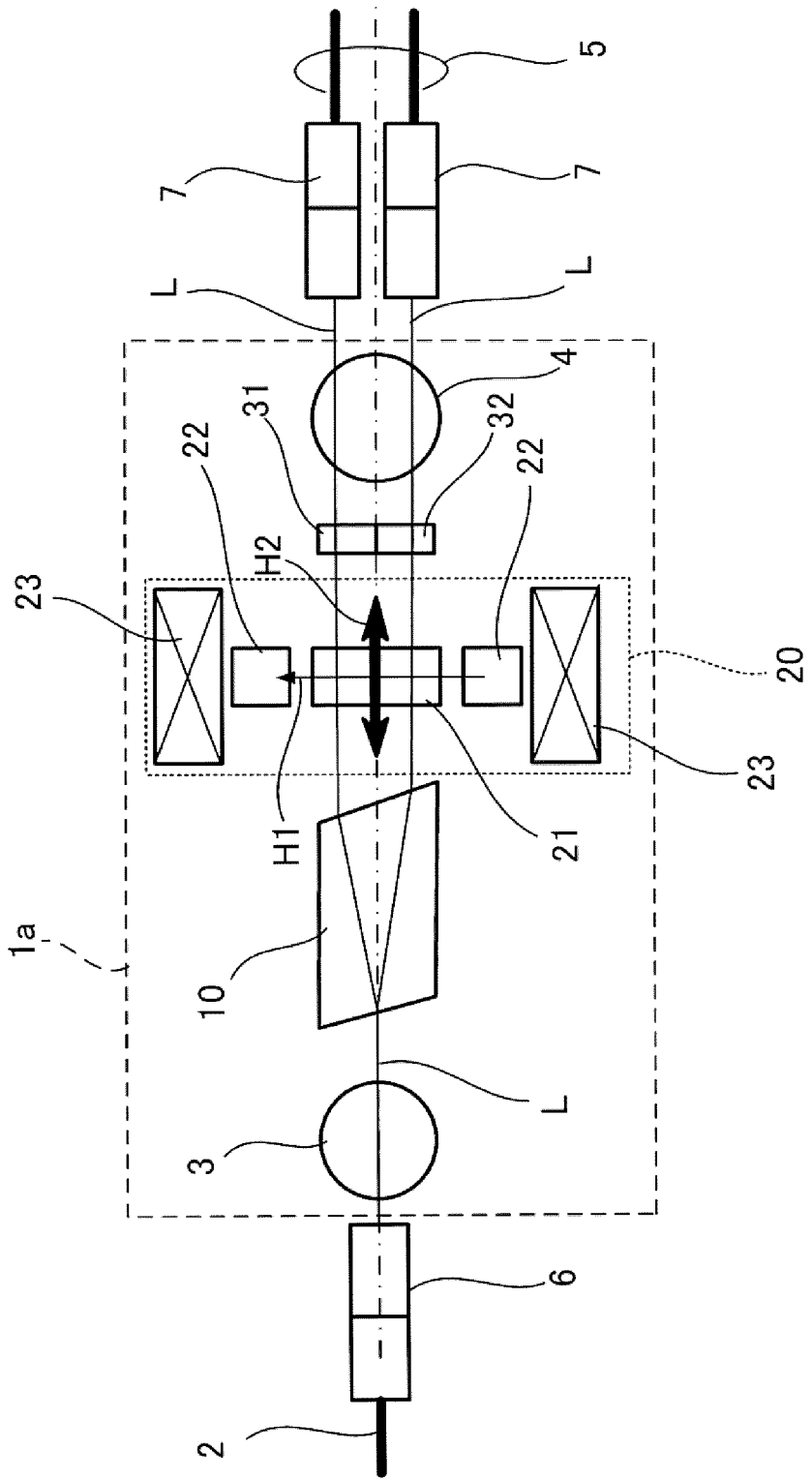
FIG. 2 is a structural diagram of a variable optical attenuator according to a first embodiment of the present invention.

FIG. 2 depicts a schematic configuration of a variable optical attenuator according to a first embodiment of the present invention. A variable optical attenuator (hereinafter, optical attenuator) 1a has a basic configuration of arranging a polarization beam splitter 10 that splits an optical signal of a non-polarized state into two linearly-polarized beams and outputs these beams, two, first and second, analyzers (31 and 32) whose optical axes are perpendicular to each other and that are parallelly arranged in the direction perpendicular to the light path, and a variable Faraday rotator 20 interposed between the polarization beam splitter 10 and the analyzers (31 and 32), in a light path L. The optical attenuator 1a takes the polarization beam splitter 10 side as the input side of the optical signal and the analyzer (31 and 32) side as the output side, relative to the variable Faraday rotator 20 and, with the input side taken as the front, the anteroposterior direction is specified along the light path L. The direction of parallelism of two analyzers (31 and 32) is taken as the right/left direction and the right or the left is specified by the direction viewed from the front to the back. Therefore, FIG. 2 is a plane view of the optical attenuator as viewed from above or from below (here, "from above" is taken).

In the variable optical attenuator 1a of the above configuration, the double refraction element composed of a rutile crystal, yttrium vanadate ($YVO_4$), etc., can be used as the polarization beam splitter 10. The double refraction element splits the light incoming from the front into two linearly-polarized beams perpendicular to each other corresponding to the ordinary light and the extraordinary light and outputs these beams to the back.

In this embodiment, the variable Faraday rotator 20 has a permanent magnet 22 to apply the saturated magnetic field in either right or left direction (arrow H1 in the drawing) to a Faraday element 21 composed of magneto-optical materials and an electromagnet 23 composed of a coil made by winding a conductive wire around an axis of the extended direction of the light path L, surrounding the Faraday element 21, to apply the variable magnetic field in the anteroposterior direction (arrow H2 in the drawing) to the Faraday element 21. A rare-earth iron garnet single crystal, etc., can be used as the magneto-optical materials.

The first and the second analyzers (31 and 32) are arranged so that the optical axes will be perpendicular to each other. One analyzer (31 or 32) is arranged in the light path corresponding to the ordinary light of the double refraction element making up the polarization beam splitter 10 (hereinafter, double refraction element 10) and the optical axis thereof is in the same direction as that of the polarization plane of the ordinary light. The other analyzer (32 or 31) is arranged in the light path corresponding to the extraordinary light of the double refraction element 10 and the optical axis thereof is in the same direction as that of the polarization plane of the extraordinary light.

The variable optical attenuator 1*a* of the above basic configuration is connected, on the input side, to a single-conductor, single-mode optical fiber (hereinafter, input side optical fiber) 2 and, on the output side, to an optical fiber having a two-system optical transmission path (hereinafter, output side optical fiber) 5 such as a double-conductor polarization maintaining optical fiber or two single-conductor polarization maintaining optical fibers arranged in parallel.

The variable optical attenuator 1*a* shown here has the above basic configuration (10, 20, 31, and 32), a collimator lens 3 that inputs the light outgoing from the input side optical fiber 2 to the double refraction element 10 as parallel light, and a collimator lens 4 to cause the light output from each of the two analyzers (31 and 32) to the back to be condensed to enter one system of the optical transmission path in the output side optical fiber 5 and these configurations, arranged in the light path L, are contained in one integrated body. Optical connectors (6 and 7) can be used to connect the optical fibers (2 and 5) and the optical attenuator 1*a* by the light path. Namely, one of male/female optical connectors can be connected to the end of connection with the input side and the output side of the optical attenuator 1*a* in the optical fibers (2 and 5) and the other of the optical connectors can be disposed at the end on the input side and the output side of the optical attenuator 1*a*. The light signal going from the output side optical fiber 5 to the back is input to the light receiving FE of the digital coherent receiver.

===Operation of Optical Attenuator===

Figure 3A:
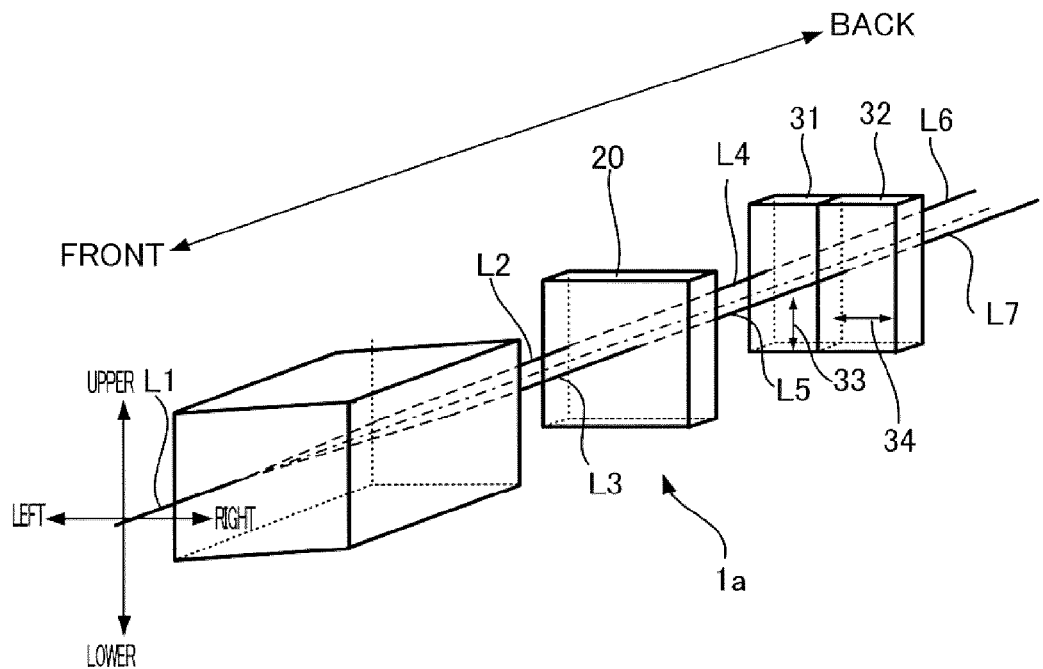
FIG. 3A is a diagram for description of an operation of the variable optical attenuator according to the first embodiment.

FIGS. 3A to 3E are diagrams of an operation of the optical attenuator 1*a* according to the first embodiment. FIG. 3A is an exploded diagram of the optical attenuator 1*a* as viewed from obliquely upward.

Figures 3B, 3C, 3D, 3E:
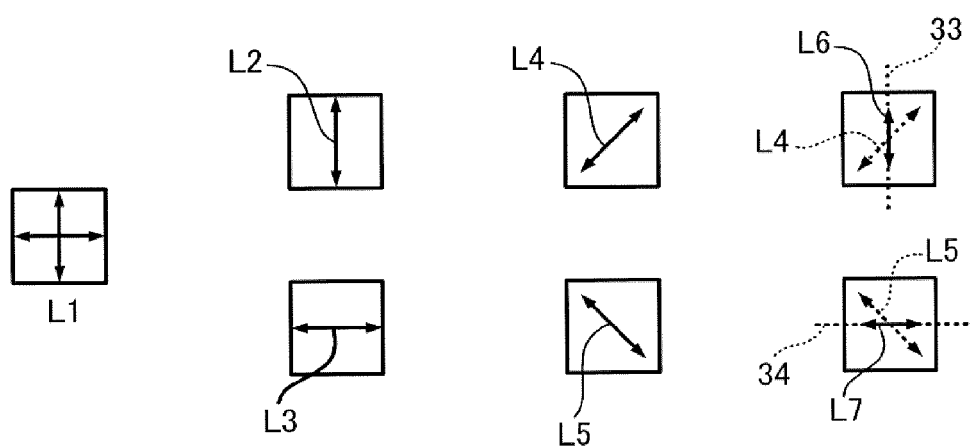
FIG. 3B is a diagram for description of the operation of the variable optical attenuator according to the first embodiment.
FIG. 3C is a diagram for description of the operation of the variable optical attenuator according to the first embodiment.
FIG. 3D is a diagram for description of the operation of the variable optical attenuator according to the first embodiment.
FIG. 3E is a diagram for description of the operation of the variable optical attenuator according to the first embodiment.

FIG. 3B depicts the direction of polarization of the light (L1) to be input to the polarization beam splitter 10 when the optical attenuator 1*a* is viewed from the front. FIG. 3C depicts the direction of polarization of the beams (L2 and L3) to be input to the variable Faraday rotator 20 when the optical attenuator 1*a* is viewed from the front. FIG. 3D depicts the direction of polarization of the beams (L4 and L5) to be input to the first and the second analyzers (31 and 32) when the optical attenuator 1*a* is viewed from the front. FIG. 3E depicts the direction of polarization of the beams (L6 and L7) to be output from the first and the second analyzers when the optical attenuator 1*a* is viewed from the front.

FIG. 3A depicts the optical attenuator 1*a*, omitting the magnetism applying means such as the permanent magnet 22 and the electromagnet 23 making up the variable Faraday rotator 20. The operation will now be described of the optical attenuator according to the first embodiment with reference to FIGS. 3A to 3E.

Firstly, as shown in FIG. 3B, when the signal light L1 incoming from the front along one light path enters the double refraction element 10, the signal light is split into two light paths of the ordinary light and the extraordinary light. As shown in FIG. 3C, the ordinary light and the extraordinary light are the linearly-polarized beams perpendicular to each other (L2 and L3) and the two split linearly-polarized beams (L2 (first linearly-polarized beam) and L3 (second linearly-polarized beam)) separately enter the variable Faraday rotator 20. The variable Faraday rotator 20 rotates the two incoming linearly-polarized beams (L2 and L3) by the angle corresponding to the magnitude of the current applied to the coil winding of the electromagnet 23 and outputs these beams to the back. Namely, as shown in FIG. 3D, the two linearly-polarized beams (L2 and L3) that have entered the variable Faraday rotator 20 are output to the back as two linearly-polarized beams with the polarization plane rotated while the orthogonal state is maintained (L4 (third linearly-polarized beam) and L5 (fourth linearly-polarized beam)) and at the same time, separately enter the first and the second analyzers (31 and 32).

The first and the second analyzers (31 and 32) have the optical axes (33 and 34) perpendicular to each other and the two linearly-polarized beams (L4 and L5) that have entered the analyzers (31 and 32) are transmitted to the back as the linearly-polarized beams (hereinafter, output beams L6 (fifth linearly-polarized beam) and L7 (sixth linearly-polarized beam)) in the direction of the optical axes (33 and 34) of the analyzers (31 and 32) that the L4 and L5 beams have entered, respectively. At this moment, as shown in FIG. 3E, the output beams (L6 and L7) are modulated to the intensity corresponding to the component in the direction of the optical axis of the analyzers (31 and 32) in the beams (L4 and L5) that have entered the analyzers (31 and 32).

Figure 1:
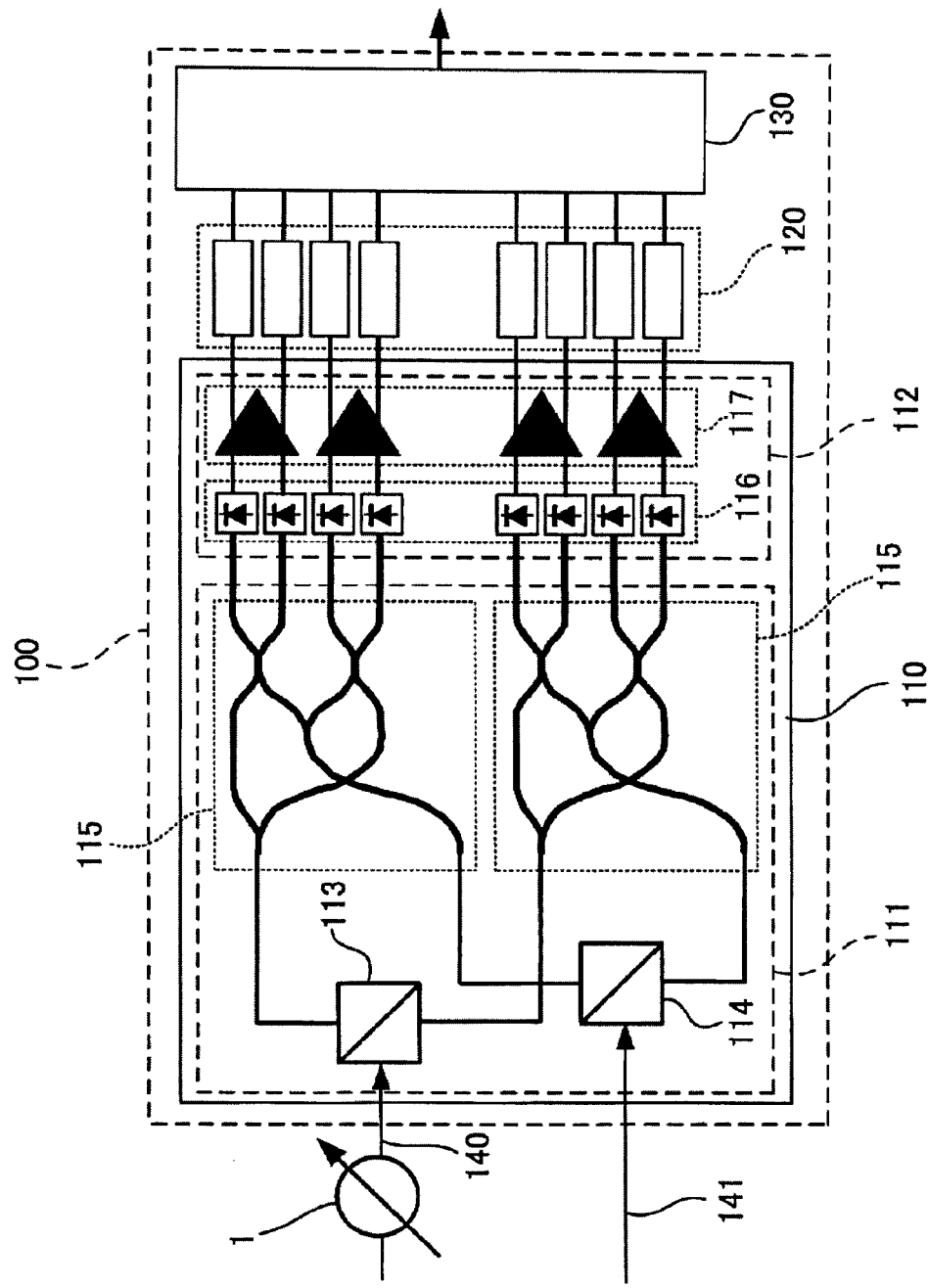
FIG. 1 is a diagram of a configuration of a digital coherent receiver.
Figure 4:
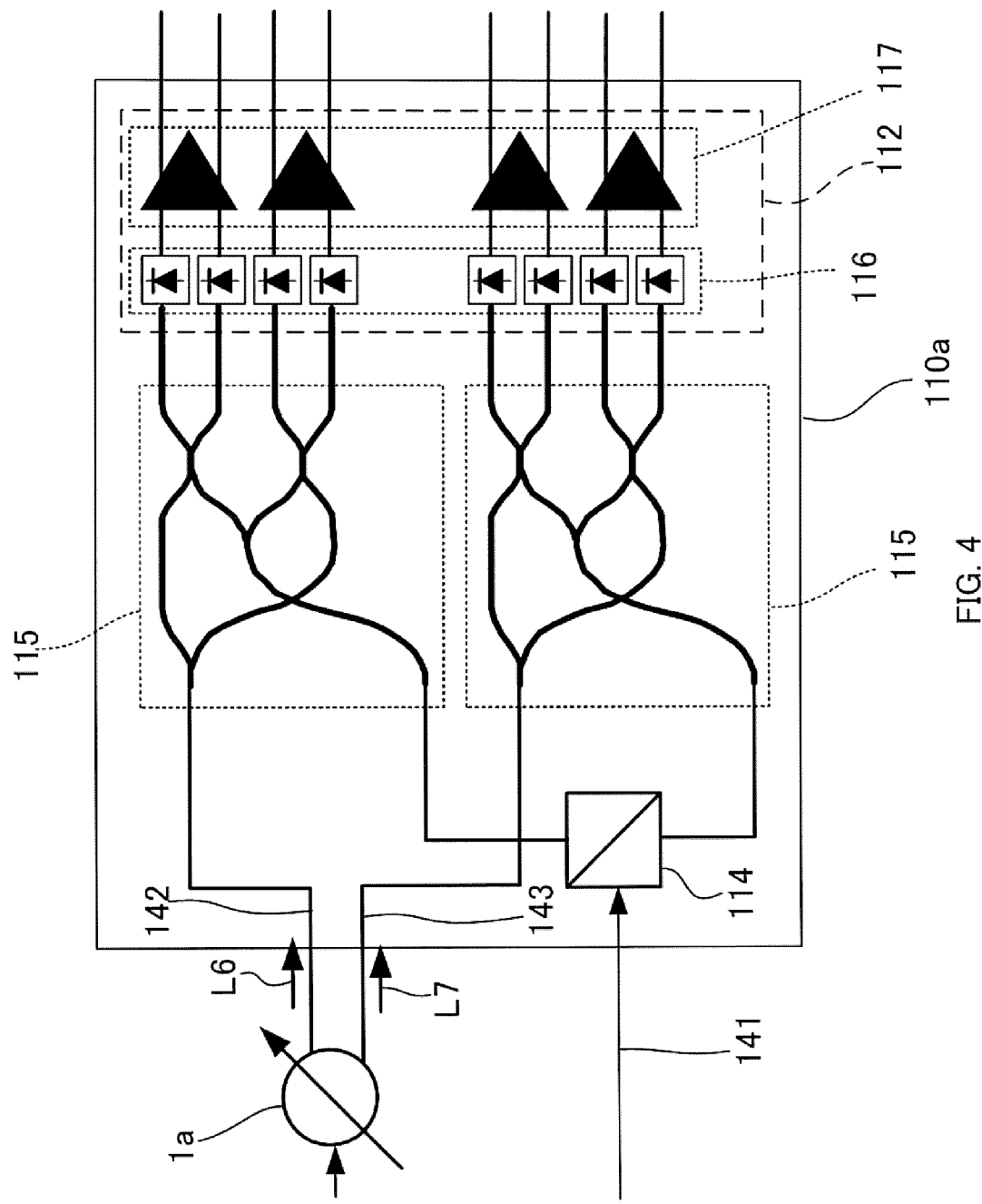
FIG. 4 is a diagram of a configuration of a light receiving FE to be connected to the variable optical attenuator according to the first embodiment.

FIG. 4 depicts a configuration of an FE 110*a* of the digital coherent receiver to be connected at the subsequent stage of the optical attenuator 1*a* according to the first embodiment. The two linearly-polarized beams (L6 and L7) output from the optical attenuator 1*a* to the back after intensity-modulated immediately propagate in two light paths (142 and 143) and are input to the 90° optical hybrid 115 of the light receiving FE 110*a* at the subsequent stage. Therefore, the light receiving FE 110*a* does not require the polarization beam splitter (FIG. 1, reference numeral 113) and the digital coherent receiver can be made smaller. As compared with the case in which the 90° optical hybrid 115 and the polarization beam splitter 113 making up the light receiving FE 110 are separate units, for example, in the digital coherent receiver 100 shown in FIG. 1, in the case of the digital coherent receiver 110*a* shown in FIG. 4, the number of the fusion points of the optical fibers decreases by one for one light path and the deterioration and the loss of the signal due to the fusion of the optical fibers can be reduced.

Thus, according to the variable optical attenuator 1*a* of this embodiment, it is made possible to output two linearly-polarized beams perpendicular to each other after intensity-modulated. This makes it possible to omit the polarization beam splitter of the digital coherent receiver and to contribute to the smaller size of the digital coherent receiver.

Second Embodiment

Various optical components and optical devices lying in the optical communication path are required to output the optical signal stable with a predetermined intensity to the optical components and optical devices at the subsequent stage. For example, in the optical attenuator 1a of the first embodiment, the current applied to the electromagnet 23 is controlled and the intensity of the output beam is controlled, depending on the intensity of the optical signal input to itself. In the optical attenuator of the first embodiment, the intensity of this input optical signal is measured by a network tap at the stage previous to the optical attenuator and the optical attenuator is controlled based on the measured value. The network tap is an optical component for causing a minute amount of light to be diverged from the light propagating in the optical communication path by a tap plate using a dielectric multi-layer, etc., and for detecting the diverged light by a photodetector.

If the network tap is arranged in the optical communication path as an individual optical component, however, the signal deterioration and loss is unavoidable at the connection of the network tap and the variable optical attenuator. Since it is also necessary to secure a space for connection of the optical attenuator and the network tap, the configuration related to the digital coherent receiver will further increase in size. Accordingly, the optical attenuator having the function of the network tap will be cited as a second embodiment of the present invention.

Figure 5:
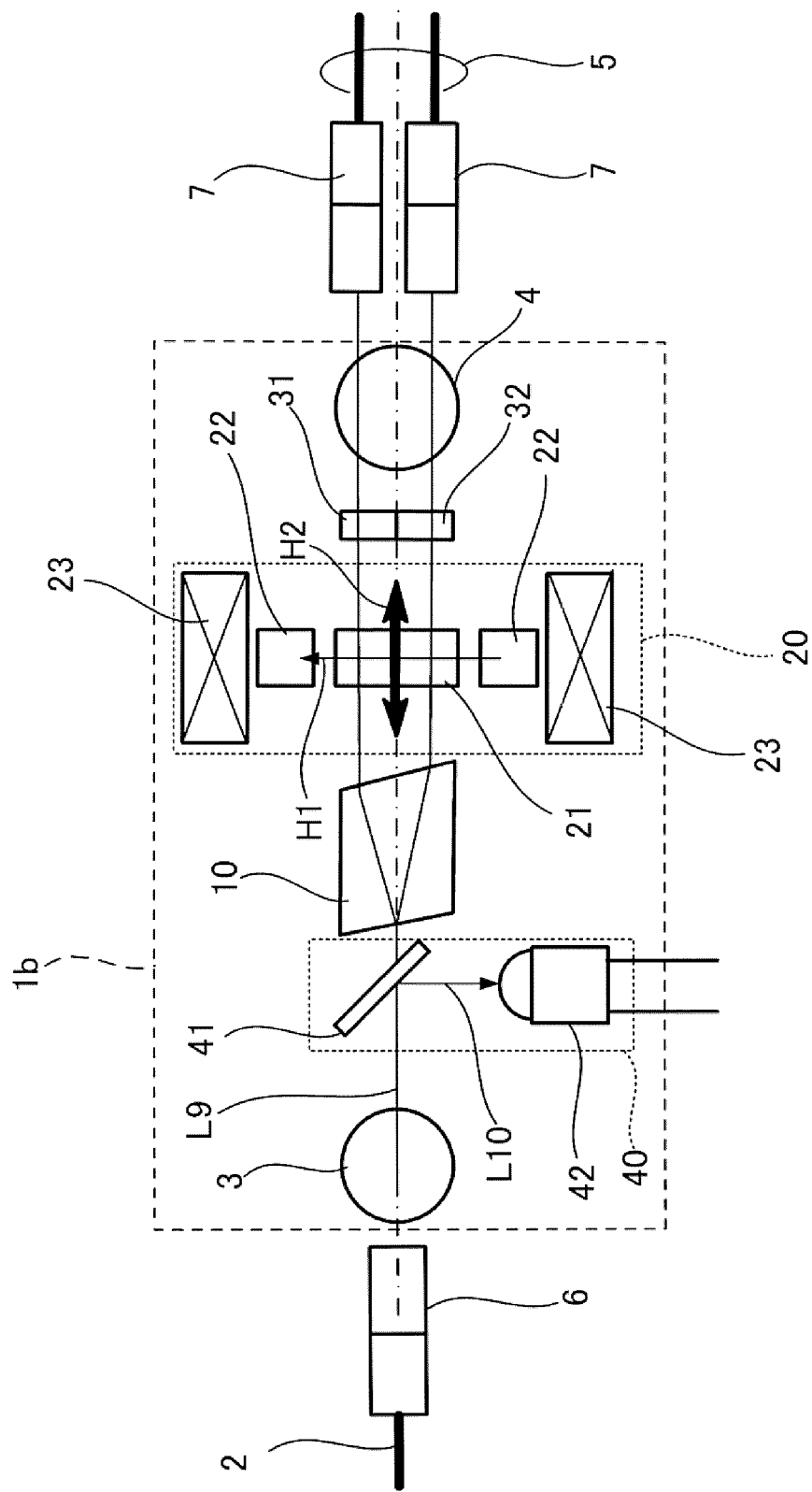
FIG. 5 is a structural diagram of the variable optical attenuator according to a second embodiment of the present invention.

FIG. 5 depicts a schematic configuration of an optical attenuator 1b according to the second embodiment. As shown in FIG. 5, the optical attenuator 1b has a network tap 40 composed of a tap plate 41 and a photodetector 42, immediately before the double refraction element 10.

The tap plate 41, lying in the midst of the light path from the collimator lens 3 ahead to the double refraction element 10, reflects a part of a beam L9 propagating in the light path toward a light receiving face of the photodetector 42. The photodetector 42 receives a diverging beam L10 reflected by the tap plate 41 and outputs the electric signal corresponding to the intensity of the received beam.

Thus, in the optical attenuator 1b according to the second embodiment, two optical components of the network tap 40 and the same optical attenuator 1a as in the first embodiment are spatially arranged in a same body. Namely, two optical components are connected by the light path without intervention of the optical fiber. This makes it possible to prevent the deterioration and the loss of the optical signal attributable to the connection of the network tap and the variable optical attenuator by the intervention of the optical fiber. There is no need for the space for spreading out the optical fibers and the space can be reduced for installing the optical components and various devices in the optical transmission path around the digital coherent receiver.

Other Embodiment

Figure 6:
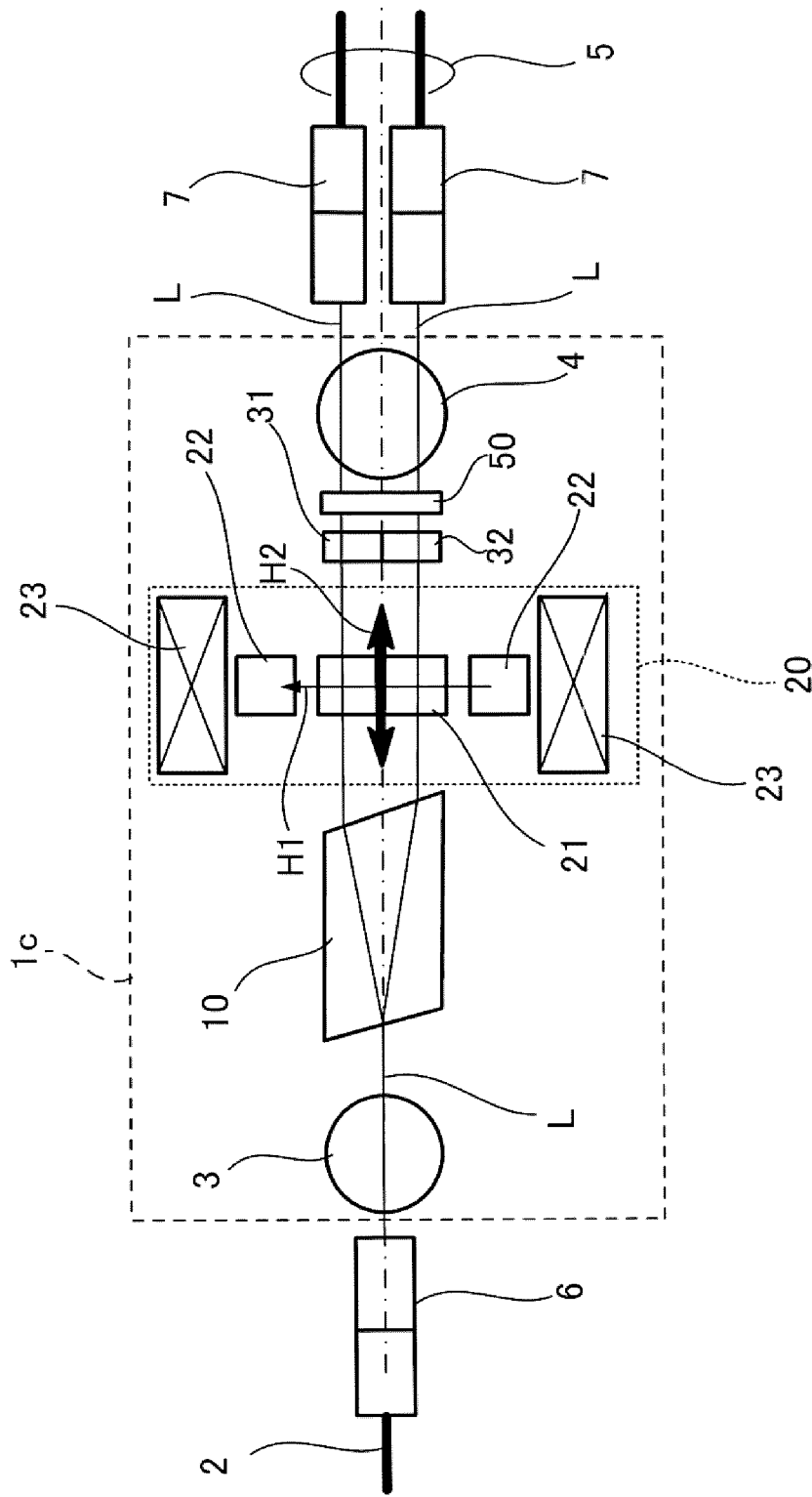
FIG. 6 is a structural diagram of the variable optical attenuator according to other embodiment of the present invention.

While each of the above embodiments uses the double refraction element as the polarization beam splitter, of course, the polarization beam splitter can be other than the double refraction element so long as it splits the incoming light into two linearly-polarized beams perpendicular to each other and outputs these beams. When the double refraction element is used as the polarization beam splitter, a phase-compensating plate 50 to compensate for the phase difference between the ordinary light and the extraordinary light can be arranged at the stage subsequent to the analyzers (31 and 32), as in a variable optical attenuator 1c shown in FIG. 6. This makes it possible to output the optical signal of higher quality to the light receiving FE at the subsequent stage.

Figure 7:
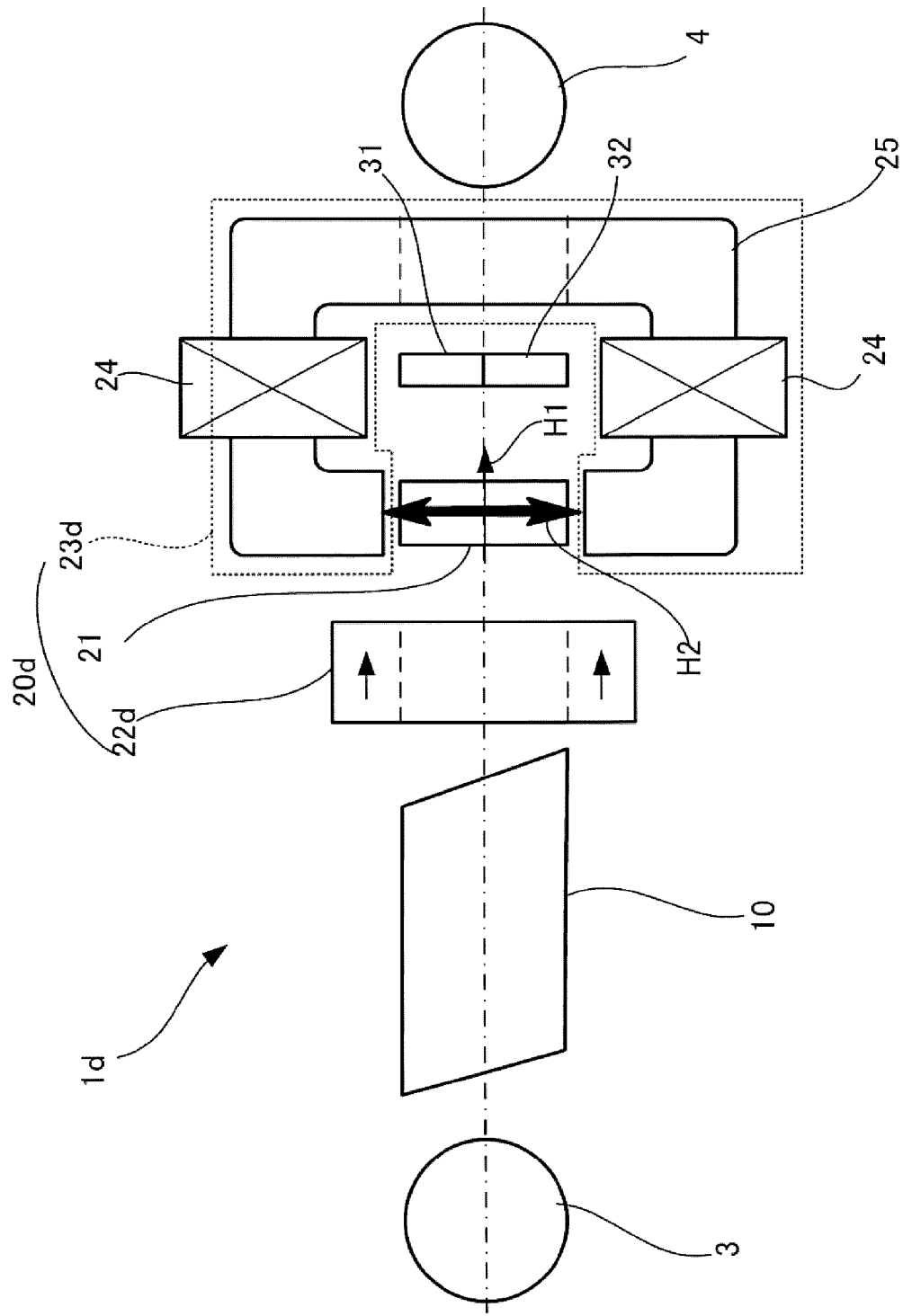
FIG. 7 is a structural diagram of the variable optical attenuator according to other embodiment of the present invention.

While, in each of the above embodiments, the electromagnet 23 making up the variable Faraday rotator 20 is substantially an air core coil, the electromagnet can be a magnetic core coil so long as it can cause the light output from the double refraction element 10 to the back to enter the Faraday element 21 or an electromagnet 23d can be made up by using the a coil 24 and a yoke 25 as shown in FIG. 7. In the example shown in FIG. 7, a permanent magnet 22d of a hollow-cylindrical shape to apply the saturated magnetic field in the anteroposterior direction is arranged anterior to the Faraday element 21 and the electromagnet 23d is so configured that both ends of the C-shaped yoke 25 will sandwich the Faraday element 21 from above and below to apply the variable magnetic field in the vertical direction to the Faraday element 21. Anyway, the configuration of the magnetism applying means of applying the magnetic field to the Faraday element 21 is only required to be the configuration capable of arbitrarily and variably controlling the polarization plane of the linearly-polarized light entering the variable Faraday rotator.

Thus, according to the variable optical attenuator according to each of the above embodiments, two linearly-polarized beams perpendicular to each other after intensity-modulated can be output. This makes it possible to omit the polarization beam splitter of the digital coherent receiver and to contribute to the smaller size of the digital coherent receiver.

The variable optical attenuator according to each of the above embodiments can contribute to the smaller size of the digital coherent receiver and the reduction of the deterioration or loss of the light signal due to the fusion of the optical fibers.

The above embodiments are intended for easy understanding of the present invention and are not intended for limited interpretation of the present invention. The present invention can be changed or improved variously without departing from the spirit thereof and the present invention includes equivalents thereof.

What is claimed is:

1. A variable optical attenuator comprising:
a polarization beam splitter that splits a beam incoming from the front along one light path into a first linearly-polarized beam and a second linearly-polarized beam, with polarization planes thereof perpendicular to each other as well as outputting the first linearly-polarized beam and the second linearly-polarized beam individually along two parallel light paths going to the back;
a variable Faraday rotator that is configured to include a Faraday element composed of magneto-optical materials and a magnetism applying means of variably controlling the direction and the magnitude of a magnetic field to be applied to the Faraday element and rotates each of the polarization planes of the first linearly-polarized beam and the second linearly-polarized beam individually incoming from the polarization beam splitter along the two parallel light paths by controlling the magnetic field to be applied to the Faraday element by the magnetism applying means, outputting them as a third linearly-polarized beam and a fourth linearly-polarized beam, respectively, further to the back;
a first analyzer that is configured to have an optical axis of the same direction as that of the polarization plane of the first linearly-polarized beam and modulates the third linearly-polarized beam incoming from the variable Faraday rotator to a component in the direction of the polarization plane of the first linearly-polarized beam for outputting it as a fifth linearly-polarized beam; and a second analyzer that is configured to have the optical axis of the same direction as that of the polarization plane of the second linearly-polarized beam and modulates the fourth linearly-polarized beam incoming from the variable Faraday rotator to the component in the direction of the polarization plane of the second linearly-polarized beam for outputting it as a sixth linearly-polarized beam, the fifth linearly-polarized beam propagating in a first light path and being input to a first 90° optical hybrid without additional splitting before arriving at the first 90° optical hybrid, the first 90° optical hybrid being arranged at a subsequent stage of the variable optical attenuator, the sixth linearly-polarized beam propagating in a second light path and being input to a second 90° optical hybrid without additional splitting before arriving at the second 90° optical hybrid, the second 90° optical hybrid being arranged at a subsequent stage of the variable optical attenuator.

2. The variable optical attenuator of claim 1, further comprising:

a network tap that is disposed in the one light path anterior to the polarization beam splitter and outputs a part of the beam incoming from the front toward the polarization beam splitter along the one light path as well as causing the other part thereof to diverge as a diverging beam to output an electric signal corresponding to the received beam intensity of the diverging beam.

3. The variable optical attenuator of claim 1, wherein the polarization beam splitter is a double refraction element that splits a beam incoming from the front into the ordinary light as the first linearly-polarized beam and the extraordinary light as the second linearly-polarized beam, and wherein the variable optical attenuator further comprises:

a phase-compensating plate arranged posterior to the first analyzer and the second analyzer to compensate for a phase difference between the ordinary light and the extraordinary light.

4. The variable optical attenuator of claim 1, wherein the magnetism applying means is composed of an electromagnet to apply a variable magnetic field in the anteroposterior direction, and a permanent magnet to apply saturated magnetism in the direction perpendicular to the light path, to the Faraday element.

5. The variable optical attenuator of claim 1, wherein the magnetism applying means is composed of an electromagnet to apply a variable magnetic field in the direction perpendicular to the light path, and a permanent magnet to apply saturated magnetism in the anteroposterior direction, to the Faraday element, and wherein the electromagnet is so constructed that both ends of a C-shaped yoke will sandwich the Faraday element from the direction perpendicular to the light path and the permanent magnet is of a hollow-cylindrical shape and is arranged anterior or posterior to the Faraday element.

* * * * *